April 10, 1934.                    H. DERCUM                    1,954,286
                                 BIRD CAFETERIA
                              Filed March 23, 1932
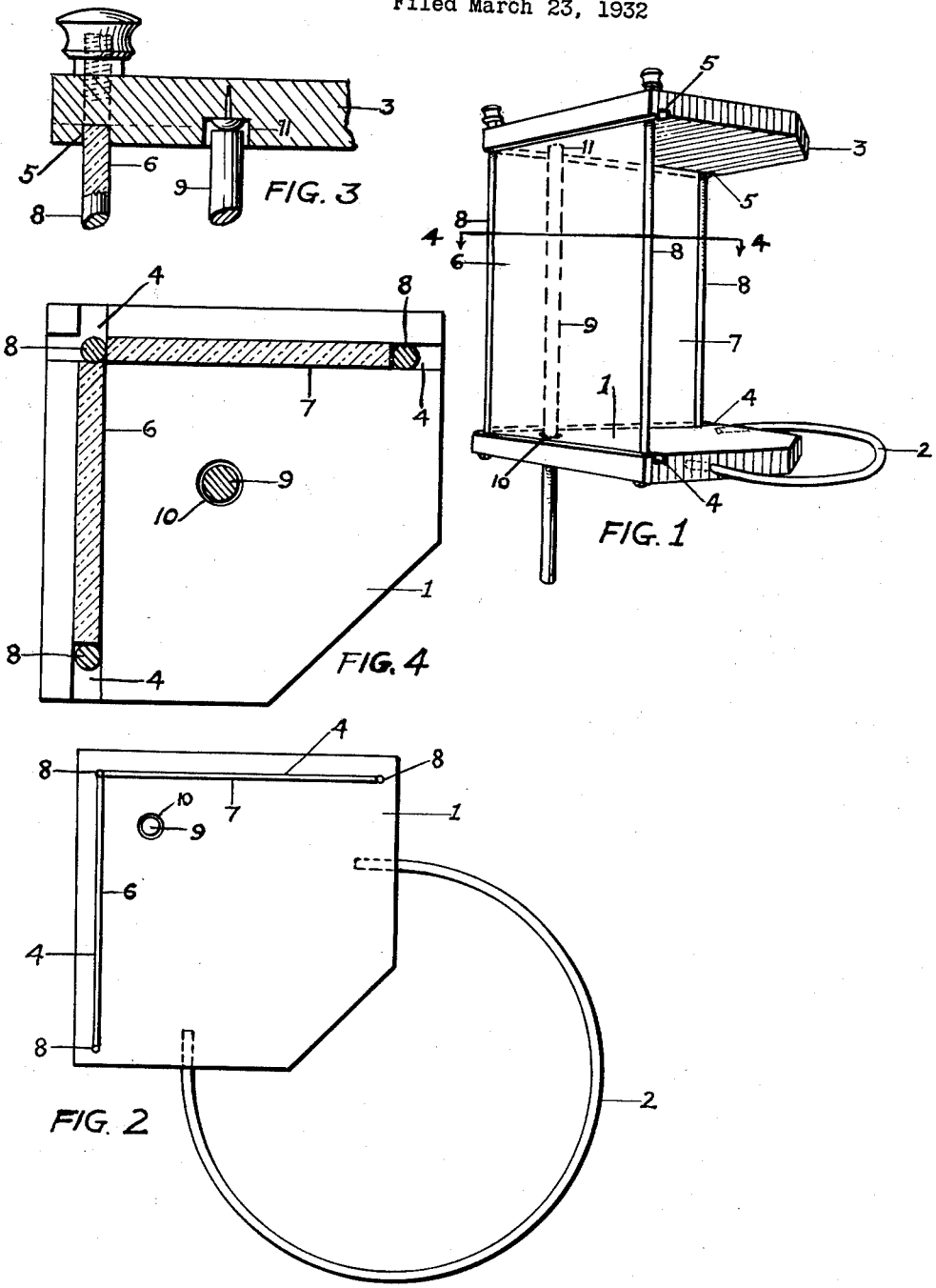
INVENTOR.
HERMANN DERCUM
BY
ATTORNEY.

Patented Apr. 10, 1934

1,954,286

UNITED STATES PATENT OFFICE 1,954,286

BIRD CAFETERIA

Hermann Dercum, Willoughby, Ohio

Application March 23, 1932, Serial No. 600,800

5 Claims. (Cl. 119—51)

My invention pertains to a bird cafeteria of the type which constitutes a partially sheltered depository for food to be eaten by wild birds.

I am well aware that during the past decade there has been a growing popularity for coaxing wild life to semi-tameness by establishment of private feeding stations, and especially in the winter season near the window of a home where convenient observation may be enjoyed. Some so-called feeding receptacles have been supplied with vanes to insure presentation of the entry so that protection is afforded against wind, rain or snow, but so far as I have been able to discover, none has had its wall or walls almost entirely of glass and none has been so mounted as in its entirety to function as a vane.

The objects of my invention are:

To provide a bird cafeteria which will be ornamental, durable and sufficiently economical of manufacture; to provide a structure comprising a top and bottom and one or more partially enclosing walls of wire-reenforced glass facing two directions of a compass which will be likely to minimize uneasiness or alarm in the wild life which has been coaxed to feed, because permitting unobstructed observation from the site—the wire in the glass serving not only to reenforce, but to prevent the not-infrequent occurrence of injuring contact with glass by birds unaware of the obstruction; to provide a rotatable mounting for the entire cafeteria on its own center of gravity so that it always has its open side presented away from the wind. A simple type of thrust bearing for lessening friction and the provision of bolts or other connecting elements for protecting the free edges of the glass are minor features of structural merit.

Adverting to the drawing:

Figure 1 is a perspective view of a bird cafeteria embodying the features in my invention.

Figure 2 is a plan view of Figure 1 with top removed.

Figure 3 is an enlarged detailed view of a thrust bearing connection.

Figure 4 is an enlarged section on line 4—4 of Figure 1.

The structure includes, as exemplified, a quadrilateral table 1, around one corner of which is secured in any suitable manner an arcuate perch 2. In a relatively elevated position is a roof 3 which is shown to be of the same size and shape as the table 1, but which may have of course optionally by varying either as to shape or as to size. Along the two edges of the table 1 which are furthest from the perch 2, the upper side of the table 1 is fashioned with a rabbet formation 4. The lower side of the roof 3 is similarly fashioned along two correspondingly located edges with rabbet formations 5 which are adapted to be brought to spaced registery with the rabbets 4. Two pieces of wireglass 6 and 7 have their lower edges occupying the rabbets 4 and their upper edges occupying the rabbets 5. At the rear corner the edges of the glass walls 6 and 7 meet as appears in Figures 2 and 4. The assembled relation of the table 1, roof 3 and glass walls 6 and 7 is maintained by a plurality of bolts 8. According to the drawing three bolts are employed which pass through the table and through the roof above which they may be supplied with the ornamental nuts shown. Two of the bolts 8 are located along the separated forward edges of the walls 6 and 7 respectively, whereas the third bolt exteriorly occupies the angle formed at the meeting edges of the walls 6 and 7. In such positions they not only protect the glass edges against injury, but incidentally supply ornamentation in the nature of a bead effect.

My bird cafeteria is intended to be rotatably supported on its own center line of gravity so that any wind current against the walled enclosure will act to turn the cafeteria and maintain it in a position in which the corner where the glass walls meet is directed against the wind, thereby dispensing with any necessity for a distinct projected vane. While the illustrated form shows the cafeteria rotatably mounted on the upper end of a fixed rod 9, I declare the intention to have my invention comprehend a suspended support because some owner might prefer to hang the cafeteria. The rod 9, is loosely passed through a hole 10 in the enclosed corner of the table 1 and continuing upwardly at its upper extremity is rotatably mounted in a socket 11 which is provided in the lower side of the roof. As a simple yet satisfactory friction-reducing thrust bearing a spherical-surface-headed tack may be employed as shown.

I claim:—

1. As a new article of manufacture, a bird cafeteria comprising a supporting element, a sheltering structure including a table, a roof and a glass windbreak connecting said table and roof and presented in at least two compass directions whereby to cause the entire structure to function as a vane said supporting element having its upper end loosely passed through said table on the center line of gravity of the entire structure and having its upper extremity occupying a recess in said roof.

2. In a bird cafeteria, the combination of a table having its top provided along two compass directions with a rabbet formation, a roof similarly fashioned on its lower side with an appositioned rabbet formation, a windbreak comprising panes of glass fitted in said rabbets and means for securing the assembly and located at edges of said glass whereby additionally to protect the latter.

3. In a bird cafeteria, the combination of a table having its top provided along two sides with rabbets, a roof similarly fashioned on its lower side with appositioned rabbets two glass walls fitted at an angle to each other in said rabbets and bolts passed through said table and roof and extending along the edges of said glass walls for interlocking the parts and for protecting the friable edges of said walls.

4. In combination, a table having its top provided along two compass directions with a rabbet formation, a roof similarly fashioned on its lower side with appositioned rabbet formation, a windbreak of glass fitted in said rabbets, bolts passed through said table and roof at the edges of said glass for interlocking the parts and for protecting said edges and means for rotatably supporting said assembly on its center line of gravity.

5. A bird cafeteria comprising a table, a roof and a connecting windbreak composed of wire-glass around two sides thereof whereby not only to reinforce but to disillusion birds against impingement thereagainst, and means for rotatably supporting the whole by engagement with said roof whereby said windbreak will be turned by the wind.

HERMANN DERCUM.